United States Patent [19]

Bagdis et al.

[11] Patent Number: 4,905,831

[45] Date of Patent: Mar. 6, 1990

[54] MAGNETIC DISKETTE PACKAGE

[75] Inventors: B. Jay Bagdis, Norristown; Keith Ryan, Lansdale, both of Pa.

[73] Assignee: Chronos Incorporated, Blue Bell, Pa.

[21] Appl. No.: 275,461

[22] Filed: Nov. 23, 1988

[51] Int. Cl.$^4$ ............................................. B65D 85/57
[52] U.S. Cl. .................................... 206/444; 206/313; 206/459; 206/814
[58] Field of Search ............... 206/444, 310, 311, 312, 206/313, 610, 622, 459, 313, 814; 229/72

[56] References Cited

U.S. PATENT DOCUMENTS

| 3,788,540 | 1/1974 | Sammons | 206/459 |
| 4,114,044 | 9/1978 | Chiulli | 206/814 |
| 4,433,780 | 2/1984 | Ellis | 206/459 |
| 4,463,849 | 8/1984 | Prusak et al. | 206/312 |
| 4,473,153 | 9/1984 | Colangelo | 206/444 |
| 4,640,413 | 2/1987 | Kaplan et al. | 206/444 |
| 4,653,639 | 3/1987 | Traynor | 206/444 |
| 4,834,240 | 5/1989 | Dagostine | 206/459 |

Primary Examiner—Stephen Marcus
Assistant Examiner—Jacob K. Ackun, Jr.
Attorney, Agent, or Firm—Caesar, Rivise, Bernstein, Cohen & Pokotilow, Ltd.

[57] ABSTRACT

A package for at least one diskette having a computer program recorded thereon. The package is formed of a planar sheet of paperboard which has been cut to a shape and folded along predetermined lines. The package includes a base panel on which the diskette is disposed, a pair of flap panels, each being folded along respective fold lines over a portion of the base panel and the diskette, and a first cover panel folded along a respective fold line over the base panel and the flap panels. Each of the flap panels comprises at a first portion having indicia thereon related to the computer program and which is removable via at least one perforated line leaving at least another portion of that flap panel disposed over the diskette to hold it in place. Each of the flap panels and the first cover panel includes an additional fold line disposed closely parallel to the respective fold line between it and the base panel to enable those panels to be folded along the additional fold lines over the base panel to enable two diskettes to be enclosed within the package. The package also includes a second cover panel and a card panel, each having indicia thereon related to said computer program and removable via a perforated line from the package.

28 Claims, 4 Drawing Sheets

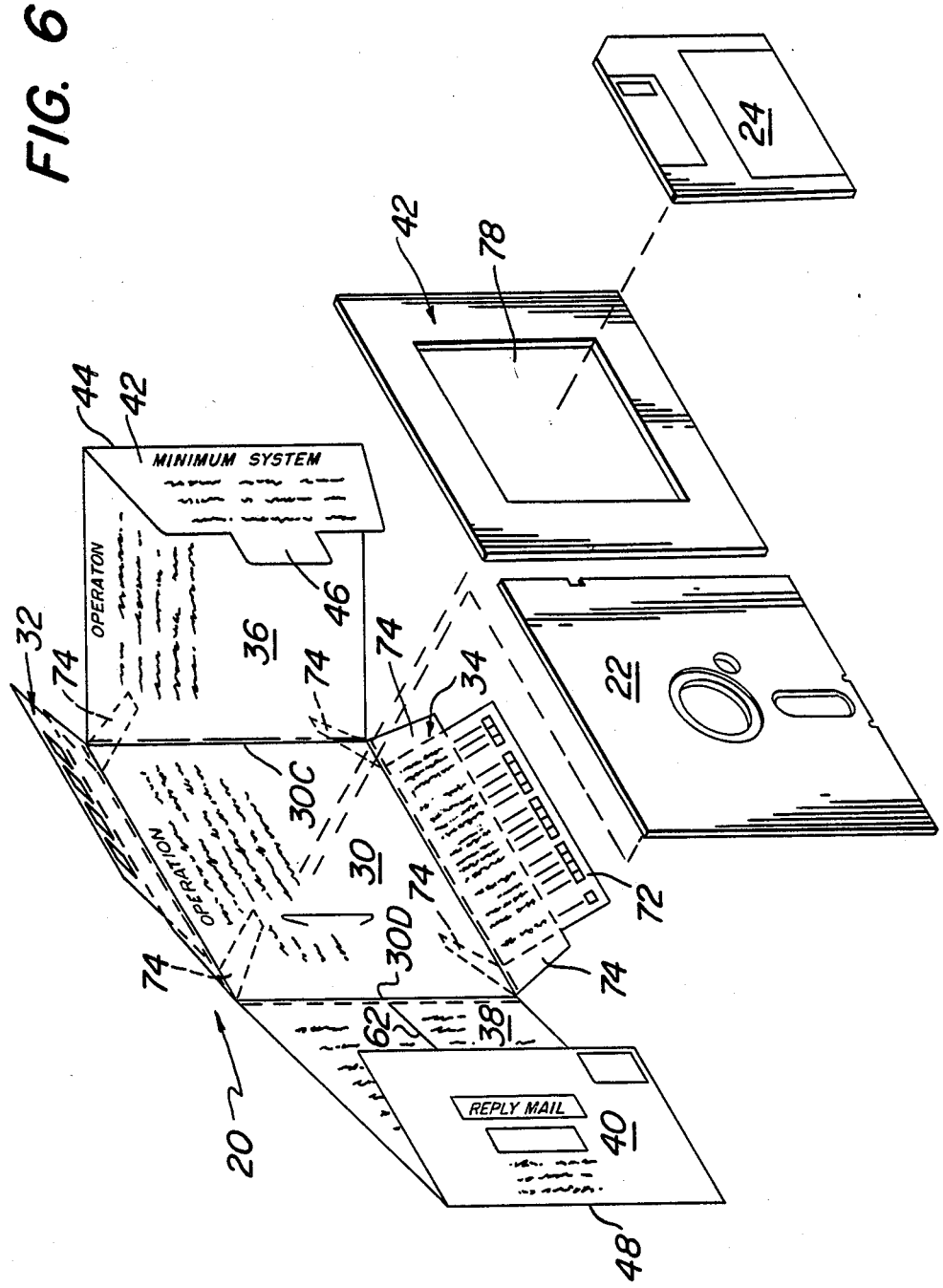

MAGNETIC DISKETTE PACKAGE

This invention relates generally to packages and more particularly to packages for holding conventional diskettes which have computer programs magnetically stored thereon.

BACKGROUND OF THE INVENTION

Conventional diskettes having computer programs magnetically stored thereon are frequently sold in folded cardboard or paperboard packages. Such packages commonly include plural panels which are connected to one another via respective fold lines. The panels interlock or interengage to form an interior space in which the diskette is located. As is also typical such packaging includes various indicia printed thereon. Examples of such indicia are installation instructions, license information, user instructions, advertising or other promotional material, etc. In some cases portions of the packaging may be torn or cut off to serve as user instruction cards, returnable warranty registration cards, keyboard templates, etc. One such package holding one or two 5.25 inch magnetic diskettes has been commercially available from Ontrack Computer Systems, Inc. of Eden Prairie, Minn. That package is an integral unit formed of a planar sheet of paperboard or other suitable material which has been die-cut to a shape (a blank) and folded along predetermined lines. The package includes a base panel of the size and shape of a 5.25 diskette and on which the diskette is disposed, a pair of smaller flap panels, each being folded along respective fold lines over respective portions of the base panel (and the diskette located thereon), and a first cover panel of the same size and shape as the base panel folded along a respective fold line over the base panel and the flap panels. The first cover panel also includes a foldable tab portion at one side thereof which is arranged to wrap around the base panel when the package is closed. The tab portion is then inserted into a slit in the base panel to hold the package secure, with the diskette thus prevented from accidental removal. The package also includes a second cover panel and a card panel which are folded under the first cover panel when the package is closed. Indicia relating to the program is printed on the base panel, the cover panels and the card panel. The card panel is shaped to serve as a conventional business reply postal card by severing it from the second cover panel. A separate reference card may be provided in the package, but does not form a portion of the package's blank.

While the above described package is suitable for its intended use to hold a diskette or diskettes therein, it nevertheless leaves much to be desired from the standpoint of functionality for other uses, e.g., use as a keyboard template, warranty registration card, reference card, installation and/or use instruction card, etc.

OBJECTS OF THE INVENTION

Accordingly, it is the general object of this invention to provide packaging which overcomes the disadvantages of the prior art.

It is a further object of this invention to provide a package for a diskette having a computer program magnetically recorded thereon, which package includes readily removable portions having indicia thereon, each for use separate and apart from the package, e.g., use as a keyboard template, warranty registration card, reference card, installation and/or use instruction card, etc., while still leaving the package fully functional to hold the diskette(s) therein against accidental removal.

It is yet a further object of this invention to provide a package of the type described above and which is arranged for holding conventional 5.25 inch or 3.5 inch computer program bearing diskettes therein.

It is still a further object of this invention to provide a package of the type described above and which is simple in construction and low in cost.

SUMMARY OF THE INVENTION

These and other objects of the instant invention are achieved by providing a package for holding at least one diskette having a computer program recorded thereon. The package is formed of a planar material which has been cut to a shape and folded along predetermined lines to form plural panels defining a closeable hollow chamber in which the diskette may be disposed. The panels comprise a base panel on which the diskette is disposed a pair of flat panels each folded along respective fold lines over a portion of the base panel, and a first cover panel folded along a respective fold line over the base and flap panels. The first cover panel has a securement means associated with it to hold the first cover panel and the flap panels over the base panel to thereby enclose the diskette within the package and preclude accidental removal of the diskette therefrom. At least one of the flap panels comprises at least a first portion having indicia thereon related to the computer program and releasably secured via at least one perforated line to the remaining portion thereof. The first indicia bearing portion can be removed from the package for use separate and apart from the package, yet leaving at least one portion of the one flap panel capable of disposition over the diskette to ensure that it does not fall out of the package when the package is closed.

In accordance with other aspects of the invention the package includes a second indicia bearing cover panel which is releasably secured to the package, and a card panel bearing indicia thereon releasably secured to the second cover panel to form a postal card. The package may also include an insert panel having a recess for receipt of a smaller dimensioned magnetic diskette.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 6 is an exploded perspective view of the package of FIG. 1 showing its interior components.

DETAILED DESCRIPTION OF THE PREFERRED EMBODIMENT

Figure 1:
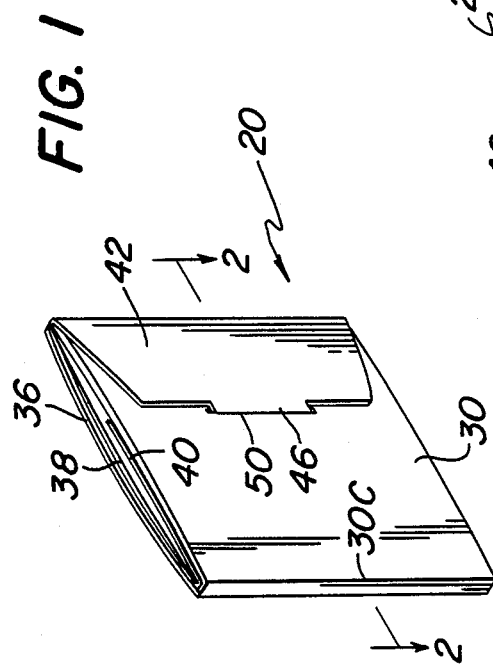
FIG. 1 is a perspective view of a package constructed in accordance with the subject invention and shown in its closed condition.

Referring now in detail to the various figures of the drawing wherein like reference characters refer to like parts, there is shown at 20 in FIG. 1 a package constructed in accordance with this invention. The package is suitable for holding 1-3 conventional 5.25 inch diskettes 22 or 1-2 conventional 3.5 inch diskettes 24. Such diskettes have magnetically stored thereon one or more computer programs. The subject package includes portions which have printed indicia thereon and which can be readily removed from the package to enable their use by the computer user separate and apart from the package, e.g., as warranty registration cards, reference cards, keyboard templates, etc., all the while the package 20 remains fully functional to store the diskette(s) therein against damage and accidental removal.

Figure 3:
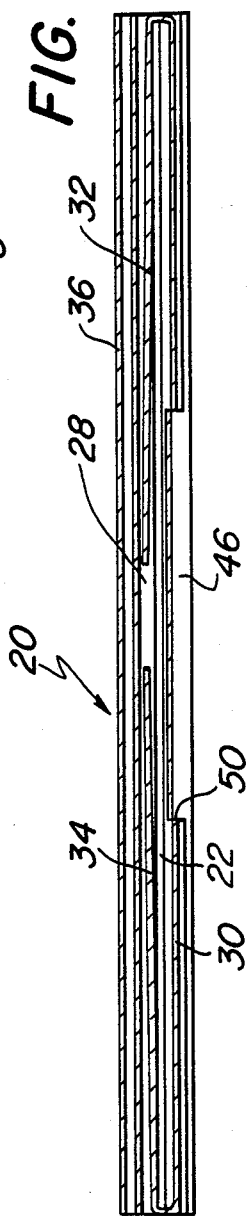
FIG. 3 is a sectional view taken along line 3—3 of FIG. 2.
Figure 4:
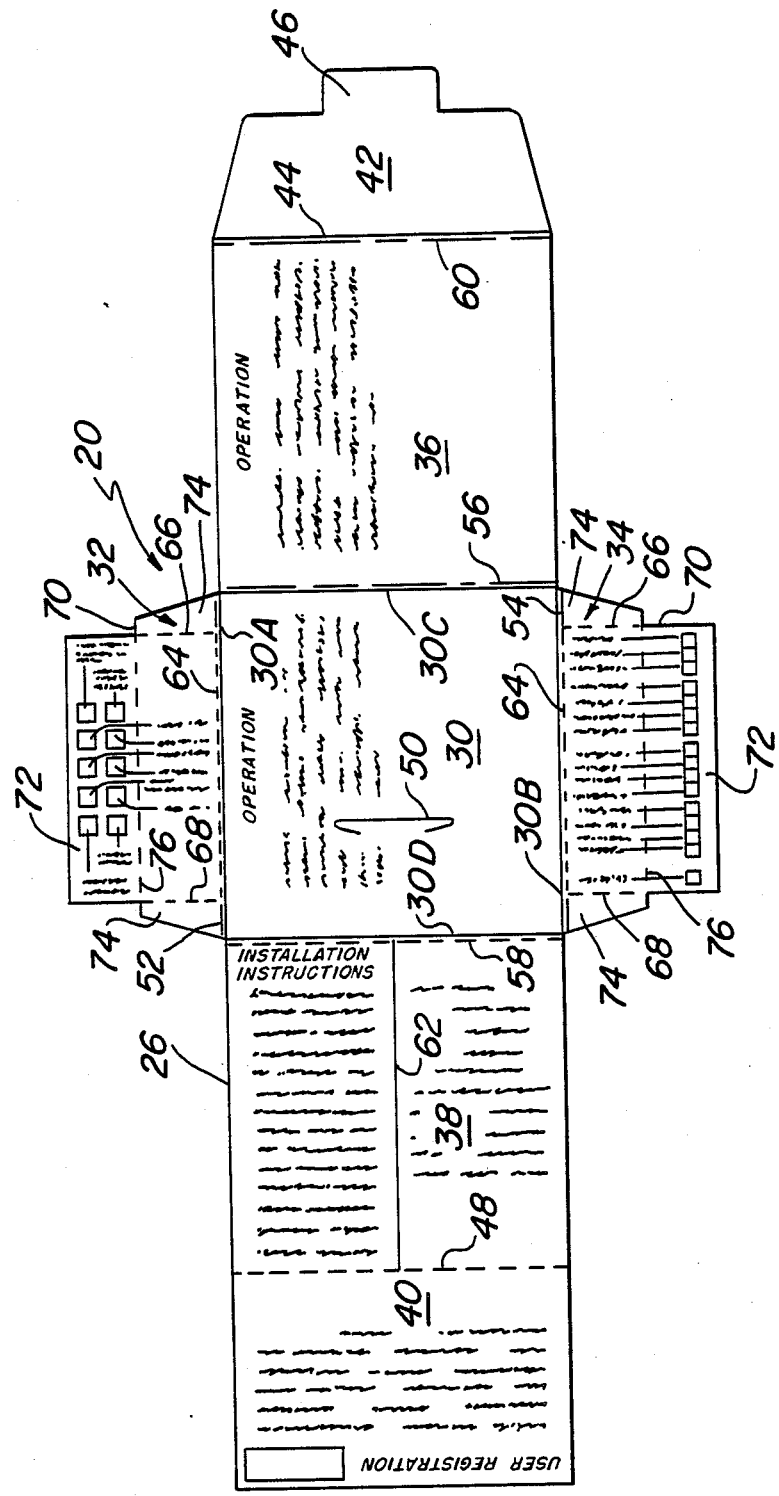
FIG. 4 is a plan view of one side of the package of FIG. 1 laid flat.
Figure 5:
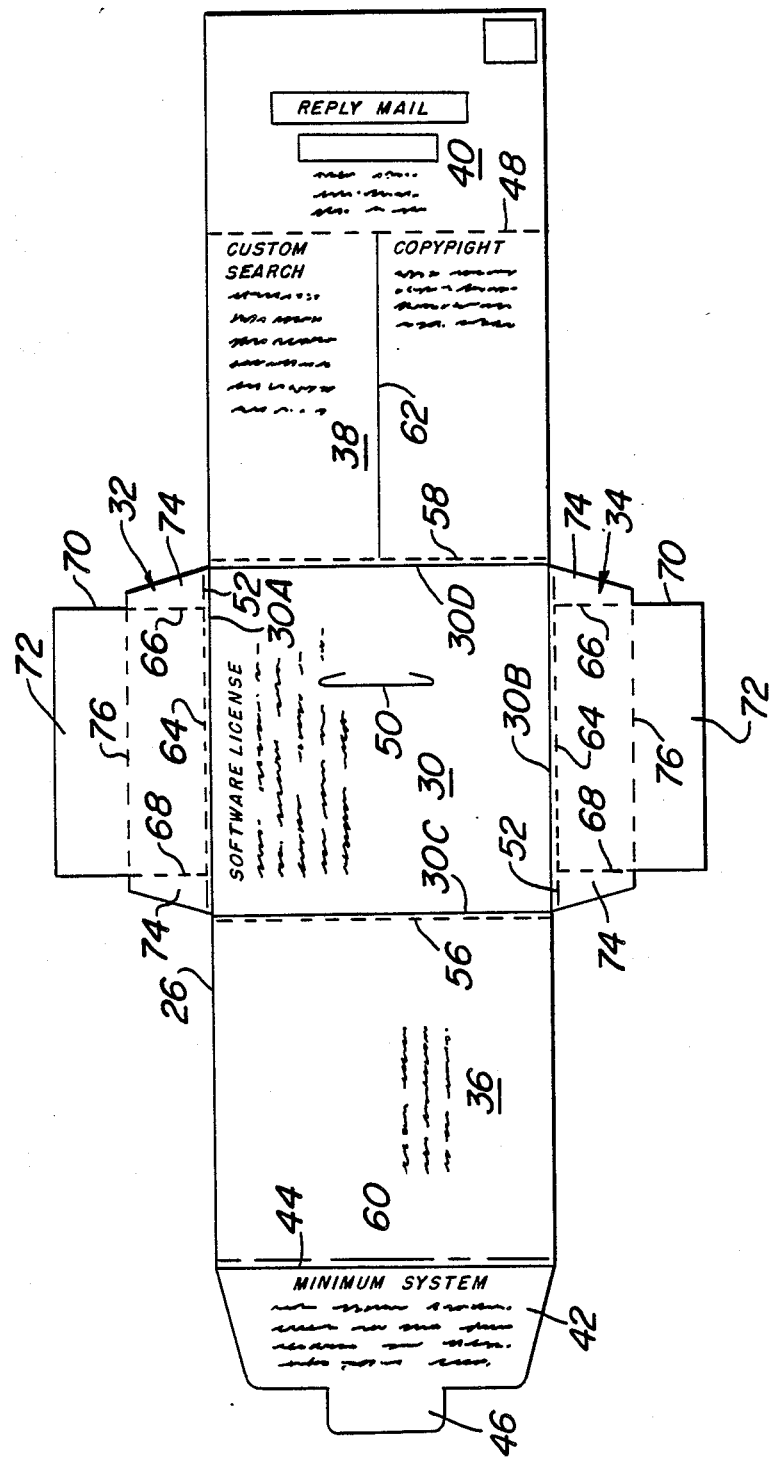
FIG. 5 is a plan view like that of FIG. 4 but showing the other side of the package laid flat.

In accordance with a preferred embodiment of this invention the package 20 is formed of any suitable sheet material, e.g., paperboard, cardboard, plastic, etc., which has been die-cut to a blank 26 having the shape shown in FIGS. 4 and 5. The package length is printed to bear the indicia (to be described later) thereon. During the formation of the blank 26 various fold lines and perforated lines (all to be described later) are formed. The blank 26 is then folded along predetermined fold lines (to be described later) to form a plurality of panels (also to be described later) which defines a closeable hollow chamber 28 (FIGS. 2 and 3) in which the diskette(s) 22 or diskette(s) 24 may be disposed.

To that end, as can be seen, the blank 26 is an integral unit which basically comprises a base panel 30, a pair of flap panels 32 and 34, a first cover panel 36, a second cover panel 38, and a card panel 40. The package 20 also comprises an insert panel 42 (FIG. 6) which is not a part of the blank 26, i.e., is separate from the integral blank unit 26, but does form a portion of one preferred embodiment of the invention.

The base panel is a generally square panel which is dimensioned to be just slightly greater than a conventional 5.25 inch floppy diskette 22. The base panel serves as the place on which the diskette(s) is (are) disposed when it (they) are stored within the package. In the embodiment shown herein the base panel includes indicia printed on both sides thereof. In particular, instructions regarding the operation of the computer software are printed on the inside surface of the base panel, while the terms of a the software license are printed on the outside surface of that panel.

The upper and lower flap panels 32 and 34 are of identical construction except for the indicia printed thereon (to be described later). As can be seen in FIGS. 4 and 5, both of the flap panels are smaller than the base panels and each includes a removable portion (also to be described later) which bears indicia thereon defining at least one keyboard template for the software. The upper flap panel is connected to the top edge of the base panel 32 via a fold line 30A. The lower flap panel is connected to the bottom edge of the base panel via a fold line 30B.

The fold lines 30A and 30B form the top and bottom marginal edges, respectively, of the base panel. The side marginal edges of that panel are formed by fold lines 30C and 30D. The fold line 30C connects the right side marginal edge of the base panel 30 to the first cover panel 36, while the fold line 30D connects the left side marginal edge of the base panel to the second cover panel 38.

Each of the cover panels 36 and 38 is of substantially the same shape and dimensions as the base panel. In the embodiment shown herein the first cover panel also includes indicia printed thereon. In particular, the inner surface of that panel includes further instructions regarding operation of the software. The outer surface of that panel may include further instructions. The first cover panel 36 also includes securement means in the form of a locking flap 42 foldably connected to the cover panel's free end by a fold line 44. The free end of the locking flap 44 is in the form of a centrally located projecting tab 46 (whose function will be described later).

The card panel 40 is connected to the second cover panel 38 via a perforated fold line 48. The card panel is dimensioned to the size and shape of a conventional business reply postal card and includes suitable indicia printed thereon. Thus, one side of the card panel includes the software vendor's mailing address, while the other side includes information and blank spaces for the purchaser to fill in to effect warranty registration for the software.

Figure 2:
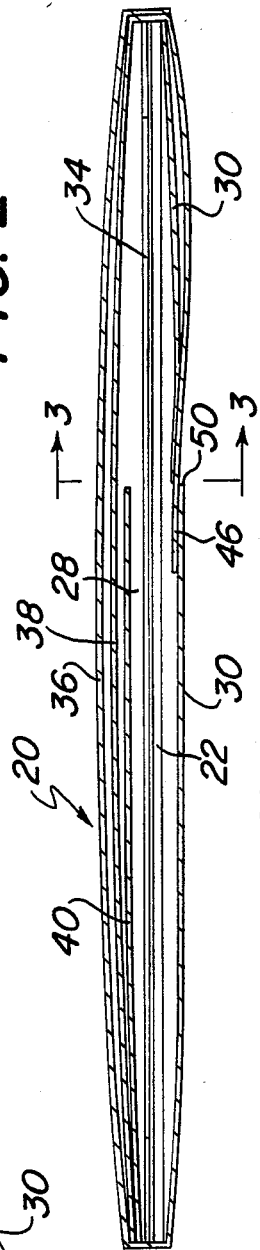
FIG. 2 is an enlarged sectional view taken along line 2—2 of FIG. 1.

The base panel 30 includes a slit 50. The slit forms a portion of the heretofore mentioned securement means. To that end, it is arranged to receive the tab 46 connected to the first cover panel 36 to hold the package in its closed state as shown in FIGS. 1-3. In the closed state the diskette(s) is (are) disposed on the base panel 30 the flap panels 32 and 34 are then folded along respective fold lines 30A and 30B over the top and bottom marginal portions of the diskette. The card panel is folded along perforated fold line 48 over the second cover panel 38. The second cover panel is in turn folded along fold line 30D over the flap panels 32 and 34 and the underlying diskette. The first cover panel is then folded along fold line 30C over the second cover panel 38, the card panel 40, the flap panels 32 and 34, and the underlying diskette. The locking panel is then folded along fold line 44 so that it is wrapped about the edge of the package and disposed over a portion of the base panel 30. The tab 46 is then inserted into the slit 50 to hold the package closed.

As mentioned earlier, the package 20 is constructed to enable it to hold 1-3 conventional 5.25 inch floppy diskettes therein. This is accomplished by placing those diskettes one on top of another within the package 20. To enable the chamber 28 to accommodate two 5.25 diskettes or one 3.5 inch diskette, it can be increased by the use of a first set of expansion creases in the form of additional fold lines in the flap panels and the two cover panels. Thus, as can be seen in FIGS. 4 and 5, the top flap panel 32 includes an expansion crease or fold line 52 extending the width thereof and disposed parallel to the fold line 30A, but spaced therefrom by a distance just slightly greater than the thickness of two 5.25 inch floppy diskettes. In a similar manner the bottom flap panel includes an expansion crease or fold line 54 extending the width thereof and disposed parallel to the fold line 30B, but spaced therefrom by a distance just slightly greater than the thickness of two 5.25 inch floppy diskettes. So, too, the first cover panel includes an expansion crease or fold line 56 extending the height thereof and disposed parallel to the fold line 30C, but spaced therefrom by a distance just slightly greater than the thickness of two 5.25 inch floppy diskettes, while the second cover panel includes a fold line 58 extending the height thereof and disposed parallel to the fold line 30D, but spaced therefrom by a distance just slightly greater than the thickness of two 5.25 inch floppy diskettes. The first cover panel also includes a second fold line 60 extending the height thereof and disposed parallel to the fold line 44, but spaced therefrom by a distance just slightly greater than the thickness of two 5.25 inch floppy diskettes. Accordingly, when the package 20 contains two 5.25 inch floppy diskettes 22 or one 3.5 inch diskette, the flap panels 32 and 34 and the cover panel 36 and 38 are folded along the first set of expansion creases 52, 54, 56, 58 and 60, respectively, not 30A, 30B, 30C, 30D and 44, respectively (as is the case for holding a single 5.25 inch floppy diskette).

In accordance with a preferred embodiment of this invention the flap panels and cover panels also include a second set of expansion creases (not shown). The expansion creases of the second set are spaced from the respective ones of the first set of expansion creases by a distance just slightly greater than the thickness of a 5.25 inch floppy diskette. This construction enables a third 5.25 inch floppy diskette (or a second 3.5 inch diskette) to be held within the package by folding the package along the second set of expansion creases.

The second cover panel 38 is arranged to be removed from the package to enable it to be used as an instruction card which can be placed wherever the user desires. To that end the fold line 58 is perforated, so that the second cover panel can be readily separated (torn) from the package. The second cover panel can, in turn, be readily separated from the card panel by tearing along the perforated fold line 48. In accordance with a preferred embodiment of this invention the second panel includes a fold line 62. That line extend between the perforated lines 48 and 58 and enables the second cover panel to be readily folded into a four page instruction-bearing card.

The card panel once separated, filled out and stamped can be mailed to the software vendor to register the software.

As will be appreciated by those skilled in the art the removal of the second cover panel and the card panel does not destroy the diskette holding function of the package since the locking portion 42 wraps around the severed line 58 so that the tab 46 is located within the slit 50 as described heretofore.

As mentioned earlier, the flap panels each include portions which can be removed from those panels for use separate and apart from the package, e.g., as keyboard templates. To that end with respect to the upper flap panel 32 the central portion 64 of the fold line 52 is perforated. A pair of vertically oriented perforated lines 66 and 68 extend from the ends of the perforated line 64 and terminate at the marginal edge 70 of the flap panel. Accordingly, the portion of the upper flap panel bounded by the lines 64, 66 and 68 and the marginal edge 70 can be removed from that flap panel. That portion includes indicia printed thereon showing functions performed by the various keys of the keyboard when the computer is running the software. Such indicia may be printed on one or both sides of the flap panels, as is desired. Thus, the removable portion serves to form a keyboard template 72.

The removal of the template portion 72 from the flap panel nevertheless leaves a pair of tab portions 74 of the flap panel still secured to the base panel at opposite ends of the fold line 30A. These tab portions are foldable along the fold line 30A to serve the same function as the full flap panel 32 did, namely to hold the diskette in place and thus prevent it from sliding out of the top of the package. To that end the tab portions 74 are each of sufficient width so that when they are folded over the diskette they hold the diskette in place in the same manner as described earlier. In FIG. 6, the folding of tabs 74 is shown by the phantom lines. Thus, the package retains its full functionality to hold the diskette(s) against accidental removal even after the keyboard template portions 72 of the upper flap panel have been removed.

As mentioned earlier the lower flap panel 34 is constructed in an identical manner as the upper flap panel and thus is composed of perforated lines forming the same tab portions 74 when the keyboard template 72 of the bottom flap panel is removed. Both of the keyboard templates 72 include a perforated line 76 extending across the width thereof between the marginal edges 70 of those panels. These lines enable each of the templates to be separated into two.

As can be seen in FIG. 5, the locking panel portion may, if desired, include indicia printed thereon.

When the package is used to hold one 3.5 inch diskette 24, the insert panel 42 is used. That panel is of the size and shape of a floppy diskette but is thicker, i.e., it is of the thickness of the 3.5 inch diskette. The insert panel includes a recess or opening 78 whose profile is the same as the of the diskette 24 so that the diskette 24 fits therein. Since the insert panel is thicker than a single 5.25 inch floppy diskette 22 the panels of the package are folded along the expansion creases 52, 54, 56, 58 and 60 in the same manner as described with respect to how the package is folded to store two 5.25 inch floppy diskettes therein. Such action creates a sufficiently thick chamber 28 to accommodate the insert panel with the 3.5 inch diskette therein.

When the package 20 is to hold two 3.5 inch diskettes either two insert panels 42 or one double thickness insert panel (not shown) may be used and the package is folded along the second set of expansion creases as described heretofore.

It must be pointed out at this juncture that the shape of the panels and the indicia printed thereon can be chosen as desired. For example, the portions 72 need not bear keyboard template indicia thereon, nor need those portions be separable into two. So too, the second cover panel can include any type of indicia thereon and may or may not be separable into two sections.

Without further elaboration, the foregoing will so fully illustrate our invention that others may, by applying current or future knowledge, readily adopt the same for use under various conditions of service.

We claim:

1. A package for holding at least one magnetic diskette for use in a computer disk drive, said diskette having a computer program recorded thereon, said package being formed of a planar material which has been cut to a shape and folded along predetermined lines to form plural panels defining a closeable hollow chamber in which said diskette may be disposed, said panels comprising a base panel, a pair of flap panels, and a first cover panel, said base panel having a top edge, a bottom edge, and a pair of side edges, said base panel serving as means on which said diskette is disposed, said panels of said pair of flap panels being folded along respective fold lines located at said top and bottom edges, respectively, each of said pair of flap panels being dimensioned to be disposed over only a portion of said base panel and the diskette disposed thereon, said flap panels being arranged to be selectively folded back so that they are not disposed over said diskette to enable said diskette to be lifted off said base panel, said first cover panel being folded along a respective fold line located at one of said side edges so that said cover panel is disposed over said base panel and said flap panels, securement means associated with said first cover panel for holding said first cover panel and said flap panels over the base panel to thereby enclose said diskette within said package and preclude it from accidental removal, at least one of said flap panels comprising at least a first portion having indicia thereon related to said computer program and releasably secured via at least one perforated line to the remaining portion thereof to enable said first indicia bearing portion to be torn from said package for use separate and apart from said package, yet leaving at least one portion of said one flap panel capable of disposition over said diskette to ensure that said diskette does not fall out of said package when said package is closed.

2. The package of claim 1 wherein said other of said pair of flap panels comprising at least a first indicia bearing portion releasably secured via at least one perforated line to the remaining portion thereof, to enable said first indicia bearing portion of said other flap panel to be torn from said package, yet having at least one portion of said other flap panel capable of disposition over said diskette to ensure that said diskette does not fall out of said package when said package is closed.

3. The package of claim 1 wherein each of said flap panels and said first cover panel includes an additional fold line disposed closely parallel to the respective fold line between it and said base panel, said flap panels and said first cover panel being foldable along said additional fold lines to enable 1-3 diskettes to be disposed on said base panel and enclosed within said package.

4. The package of claim 2 wherein each of said flap panels and said first cover panel includes an additional fold line disposed closely parallel to the respective fold line between it and said base panel, said flap panels and said first cover panel being foldable along said additional fold lines to enable more than one of said diskettes to be disposed on said base panel and enclosed within said package.

5. The package of claim 1 comprising a second cover panel folded along a respective fold line located at the other of said side edges so that said second cover panel is disposed over said base panel and said flap panels, but under said first cover panel.

6. The package of claim 5 wherein said second cover panel includes an additional fold line disposed closely parallel to the respective fold line between it and said base panel, said second cover panel being foldable along said additional fold lines to enable more than one of said diskettes to be disposed on said base panel and enclosed within said package.

7. The package of claim 5 wherein said second cover panel includes indicia thereon relating to said computer program and is releasably secured to said package via at least one perforated line to enable said second cover panel to be torn from said package to be used separate and apart from said package.

8. The package of claim 6 wherein said second cover panel includes indicia thereon relating to said computer program and is releasably secured to said package via at least one perforated line to enable said second cover panel to be torn from said package to be used separate and apart from said package.

9. The package of claim 6 wherein said package additionally comprises a card panel releasably secured to said second cover panel via at least one perforated line, said card panel having indicia thereon and being arranged to be torn from said package.

10. The package of claim 9 wherein said card panel is configured when torn from said package to serve as a postal card.

11. The package of claim 6 wherein said package additionally comprises a card panel releasably secured to said second cover panel via at least one perforated line, said card panel having indicia thereon and being arranged to be torn from said package.

12. The package of claim 11 wherein said card panel is configured when torn from said package to serve as a postal card.

13. The package of claim 8 wherein said second cover panel includes a fold line to enable the second cover panel to be folded therealong after said second cover panel has been torn from said package.

14. The package of claim 1 wherein said flap panel includes a second indicia bearing portion releasably secured via a respective fold line to said first indicia bearing portion thereof to enable said second indicia bearing portion to be torn away from said first indicia bearing portion.

15. The package of claim 2 wherein said other flap panel includes a second indicia bearing portion releasably secured via a respective fold line to said first indicia bearing portion thereof to enable said second indicia bearing portion to be torn from said first indicia bearing portion.

16. The package of claim 15 comprising a second cover panel folded along a respective fold line over said base panel and said flap panels, but under said first cover panel.

17. The package of claim 16 wherein said second cover panel includes an additional fold line disposed closely parallel to the respective fold line between it and said base panel, said second cover panel being foldable along said additional fold lines to enable two diskettes to be disposed on said base panel and enclosed within said package.

18. The package of claim 17 wherein said second cover panel includes indicia thereon relating to said computer program and is releasably secured to said package via at least one perforated line to enable said second cover panel to be torn from said package to be used separate and apart from said package.

19. The package of claim 18 wherein said package additionally comprises a card panel releasably secured to said second cover panel via at least one perforated line, said card panel having indicia thereon and being arranged to be torn from said package.

20. The package of claim 19 wherein said card panel is configured when torn from said package to serve as a postal card.

21. The package of claim 1 additionally comprising insert means in the form of a planar panel having a recess therein, said insert panel being arranged to be disposed within said package to hold a magnetic diskette within said recess.

22. The package of claim 1 wherein said package is dimensioned to hold a conventional 5.25 inch floppy diskette therein.

23. The package of claim 21 wherein said insert means is approximately 5.25 inch square and wherein said recess is dimensioned to hold a conventional 3.5 inch diskette therein.

24. The package of claim 1 wherein said base panel includes a slit therein and wherein said securement means comprises a tab portion projecting away from said first cover panel and which is adapted to be inserted in said slit when said package is closed.

25. The package of claim 1 wherein the indicia on said at least one first portion of said at least one of said flap panels relates to the operation of the computer program.

26. The package of claim 1 wherein each of said panels of said of pair of flap panels includes a marginal edge spaced from and generally parallel to the respective fold line about which each said flap panel is arranged to be folded, said at least one perforated line releasably securing a first portion of said at least one of said flap panels to the remaining portion of said at least one of said flap panels including a perforated line along the central portion of the fold line for said at least one of said flap panels and a pair of vertically oriented perforated lines extending from the ends of the perforated line along the central portion of the fold line and terminating at the marginal edge of said at least one of said flap panels.

27. A package for holding at least one magnetic diskette for use in a computer disk drive, said diskette having a computer program recorded thereon, said package being formed of a planar material which has been cut to a shape and folded along predetermined lines to form plural panels defining a closeable hollow chamber in which said diskette may be disposed, said panels comprising a base panel on which said diskette is disposed, a pair of flap panels each being folded along respective fold lines over a portion of said base panel and the diskette disposed thereon, a first cover panel being folded along a respective fold line over said base panel and said flap panels, securement means associated with said first cover panel for holding said first cover panel and said flap panels over the base panel to thereby enclose said diskette within said package and preclude it from accidental removal, said package being dimensioned to hold a floppy diskette of a first size thereon, further including an insert means in the form of a planar panel having a recess therein, said insert panel being arranged to be disposed within said package to hold a magnetic diskette within said recess, said recess being dimensioned to hold a conventional diskette therein of a second size smaller than said first size.

28. The package of claim 27 wherein said first size is 5.25 inches in diameter and said second size is 3.5 inches in diameter.

* * * * *